United States Patent
Hefner et al.

(10) Patent No.: US 10,210,856 B1
(45) Date of Patent: Feb. 19, 2019

(54) NOISE CONTROL SYSTEM FOR A DUCTED ROTOR ASSEMBLY

(71) Applicant: Bell Helicopter Textron Inc., Fort Worth, TX (US)

(72) Inventors: Levi C. Hefner, Arlington, TX (US); Frank B. Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 15/933,810

(22) Filed: Mar. 23, 2018

(51) Int. Cl.
| | |
|---|---|
| *G10K 11/178* | (2006.01) |
| *G10K 11/175* | (2006.01) |
| *B64C 27/04* | (2006.01) |
| *B64C 27/82* | (2006.01) |
| *H04R 1/28* | (2006.01) |

(52) U.S. Cl.
CPC ............ *G10K 11/175* (2013.01); *B64C 27/04* (2013.01); *B64C 27/82* (2013.01); *H04R 1/2869* (2013.01); *B64C 2027/8254* (2013.01); *B64C 2220/00* (2013.01); *G10K 2210/112* (2013.01)

(58) Field of Classification Search
CPC ........... G10K 11/178; G10K 2210/112; G10K 2210/12822; G10K 2210/3216; G10K 2210/11; G10K 2210/1281; G10K 2210/1282; F24F 13/24; F24F 2013/247; F05B 2260/962; B60H 2001/006
USPC .......... 381/71.1, 71.2, 71.3, 71.5, 71.7, 71.8
See application file for complete search history.

(56) References Cited

U.S. PATENT DOCUMENTS

| | | | |
|---|---|---|---|
| 5,306,119 A | 4/1994 | Bandoh et al. | |
| 5,448,645 A * | 9/1995 | Guerci | G10K 11/178 381/71.14 |
| 8,590,827 B2 | 11/2013 | Sparks | |
| 8,640,984 B2 | 2/2014 | Kebrle et al. | |
| 8,882,024 B1 | 11/2014 | McCollough et al. | |
| 9,437,180 B2 | 9/2016 | Murgia et al. | |
| 9,558,732 B2 | 1/2017 | Waite et al. | |
| 9,824,678 B1 | 11/2017 | Ou | |

(Continued)

OTHER PUBLICATIONS

Broderick; Helicopter tail rotors—III; AMU Magazine; Dec. 4, 2013.

(Continued)

*Primary Examiner* — George C Monikang
(74) *Attorney, Agent, or Firm* — Timmer Law Group, PLLC (57) ABSTRACT

A noise control system for a ducted rotor assembly, the ducted rotor assembly including a hub, a duct, and two or more blades coupled to the hub and supported by the duct. The noise control system including a microphone configured to receive a sound input generated by the ducted rotor assembly, the microphone configured for association with the hub; a speaker unit configured to generate a cancellation noise, the speaker configured for association with the hub; and a controller operably connected to the microphone and the speaker unit, the controller configured to selectively adjust harmonics of the cancellation noise to reduce an acoustic signature of the ducted rotor assembly. In another aspect, there is provided a rotorcraft with a ducted rotor assembly in a tail portion including a noise control system. In a third aspect, there is a method of reducing an acoustic signature of a ducted rotor assembly.

15 Claims, 8 Drawing Sheets

(56) References Cited

U.S. PATENT DOCUMENTS

2010/0028134 A1\* 2/2010 Slapak .................. F24F 13/24
                                                    415/119
2015/0246726 A1   9/2015 Pongratz et al.
2017/0144746 A1   5/2017 Schank et al.
2017/0349276 A1  12/2017 Fenny

OTHER PUBLICATIONS

Wikipedia; Active noise control; https://en.wikipedia.org/wiki/Active_noise_control.

\* cited by examiner

NOISE CONTROL SYSTEM FOR A DUCTED ROTOR ASSEMBLY

BACKGROUND

Technical Field

The present disclosure relates to rotorcraft acoustics, in particular, to the reduction of a rotorcraft acoustic signature.

Description of Related Art

A traditional rotorcraft, such as a helicopter, includes one main rotor system to generate aerodynamic lift to support the weight of the rotorcraft in flight and thrust to counteract aerodynamic drag and move the rotorcraft in forward flight. A tail rotor system is typically included to generate thrust in the same direction as the main rotor system's rotation to counter the torque effect created by the main rotor system. Efforts to reduce the sound produced by the main rotor system and the tail rotor system has been a focus for many years. Noise reduction has been advanced by altering the main and/or tail rotor blade design (e.g., adjusting the angle, the blade shape, and/or the number of blades).

Ducted tail rotor assemblies can reduce operational noise toward the front and rear of the helicopter (e.g., the duct prevents noise from emanating in the front and rear directions). However, a significant amount of lateral noise is broadcast from the ducted tail rotor assembly under certain conditions (e.g., above 80 knots).

There is a need for an improved noise control system for ducted rotor assemblies.

SUMMARY

In a first aspect, there is provided a noise control system for a ducted rotor assembly, the ducted rotor assembly including a hub, a duct, and two or more blades coupled to the hub and supported by the duct, including a first microphone configured to receive a sound input generated by the ducted rotor assembly, the first microphone configured for association with the hub; a first speaker unit configured to generate a cancellation noise, the first speaker unit configured for association with the hub; and a controller operably connected to the first microphone and the first speaker unit, the controller configured to selectively adjust harmonics of the cancellation noise to reduce an acoustic signature of the ducted rotor assembly.

In an embodiment, the first microphone is disposed in the hub.

In some embodiments, the first speaker unit is disposed in the hub.

In an exemplary embodiment, the first speaker unit is disposed substantially in the center of the hub.

In an embodiment, harmonics includes at least one of a frequency, an amplitude, and a phase.

In another embodiment, the noise control system includes a second ducted rotor assembly including a second hub, a second duct, and two or more blades coupled to the second hub and supported by the second duct, including a second microphone configured to receive a sound input generated by the second ducted rotor assembly, the second microphone configured for association with the second hub and operably connected to the controller; and a second speaker unit configured to generate a second cancellation noise, the second speaker unit configured for association with the second hub and operably connected to the controller.

In still another embodiment, the noise control system includes a second microphone configured to receive a sound input generated by the ducted rotor assembly, the second microphone configured to be disposed adjacent to the duct and operably connected to the controller; and a second speaker unit configured to generate a cancellation noise, the second speaker unit configured to be disposed adjacent to the duct.

In yet another embodiment, the first microphone and first speaker unit are configured to be disposed adjacent to an inlet side of the ducted rotor assembly, the noise control system includes a second microphone configured to receive a sound input generated by the ducted rotor assembly, the second microphone configured to be disposed adjacent to an outlet side of the ducted rotor assembly; and a second speaker unit configured to generate a cancellation noise, the second speaker unit configured to be disposed adjacent to the outlet side of the ducted rotor assembly.

In a second aspect, there is provided a rotorcraft, including a body, including a front portion and a tail portion; a main rotor system coupled to the front portion of the body; and a ducted rotor assembly coupled to the tail portion of the body, the ducted rotor assembly includes a hub, a duct, two or more blades coupled to the hub, and supported by the duct; and a noise control system including a first microphone configured to receive a sound input generated by the ducted rotor assembly, the first microphone configured for association with the hub; a first speaker unit configured to generate a cancellation noise, the first speaker unit configured for association with the hub; and a controller operably connected to the first microphone and the first speaker unit; the controller configured to selectively adjust harmonics of the cancellation noise to reduce an acoustic signature of the ducted rotor assembly.

In an embodiment, the first microphone is disposed in the hub.

In an exemplary embodiment, the first speaker unit is disposed in the hub.

In another embodiment, the first speaker unit is disposed substantially in the center of the hub.

In an illustrative embodiment, the harmonics include at least one of a frequency, an amplitude, and a phase.

In yet another embodiment, the noise control system includes a second microphone configured to receive a sound input generated by the ducted rotor assembly, the second microphone disposed adjacent to the duct; and a second speaker unit configured to generate a cancellation noise, the second speaker unit disposed adjacent to the duct.

In still another embodiment, the first microphone and first speaker unit are configured to be disposed adjacent to an inlet side of the ducted rotor assembly, the noise control system including a second microphone configured to receive a sound input generated by the ducted rotor assembly, the second microphone disposed adjacent to an outlet side of the ducted rotor assembly; and a second speaker unit configured to generate a cancellation noise, the second speaker unit disposed adjacent to the outlet side of the ducted rotor assembly.

In a third aspect, there is a method of reducing an acoustic signature of a ducted rotor assembly, the ducted rotor assembly including a hub, a duct, and two or more blades coupled to the hub and supported by the duct, the method including: receiving, by a microphone associated with the hub, a sound input generated by the ducted rotor assembly; determining a sound input harmonics by a controller; determining a cancellation noise by the controller based upon the sound input harmonic; and generating the cancellation noise by a speaker unit associated with the hub.

In an embodiment, the microphone is disposed in the hub.

In another embodiment, the speaker unit is disposed in the hub.

In an illustrative embodiment, the step of determining a cancellation noise includes selectively adjusting harmonics of the cancellation noise.

In an exemplary embodiment, the harmonics include at least one of a frequency, an amplitude, and a phase.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of noise control systems and methods therefor are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, assemblies, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, assemblies, etc. described herein may be oriented in any desired direction.

The noise control systems, components and features thereof, and methods relating thereto provide significant advantages over conventional systems and methods for reducing acoustic signature of a rotorcraft. In particular, the noise control system utilizes a speaker unit associated with the hub of a ducted rotor assembly. The noise control system advantageously generates a cancellation noise from the central area of the noise source (e.g., the ducted rotor assembly). Further discussion and illustration of these features are provided below.

This disclosure depicts and describes noise control systems for rotorcraft and methods relating thereto. The embodiments of the noise control systems and methods relating thereto will be described with reference to helicopter 100. The noise control systems and methods relating thereto depicted and/or described herein can be used with any aircraft having one or more ducted rotor assemblies, including tiltrotor aircrafts, helicopters, autogyros, tilt wing aircrafts, unmanned aerial vehicles (UAVs), hovercrafts, drones, personal air vehicles, and other vertical lift or VTOL aircrafts, or can further be used with any device having one or more components having rotor assemblies, including devices with propellers, windmills, and turbines. Further, any features of one embodiment of the noise control systems and methods relating thereto in this disclosure can be used with any other embodiment of the noise control systems and methods such that the other embodiment has the same or similar features, operates in the same or similar way, or achieves the same or similar functions. Some components of this disclosure are depicted by graphic shapes and symbols. Unless this disclosure specifies otherwise, such components should be understood to include the same or similar characteristics and features as those components that are named or described, though the graphic shapes and symbols may not depict each such characteristic or feature.

Figure 1:
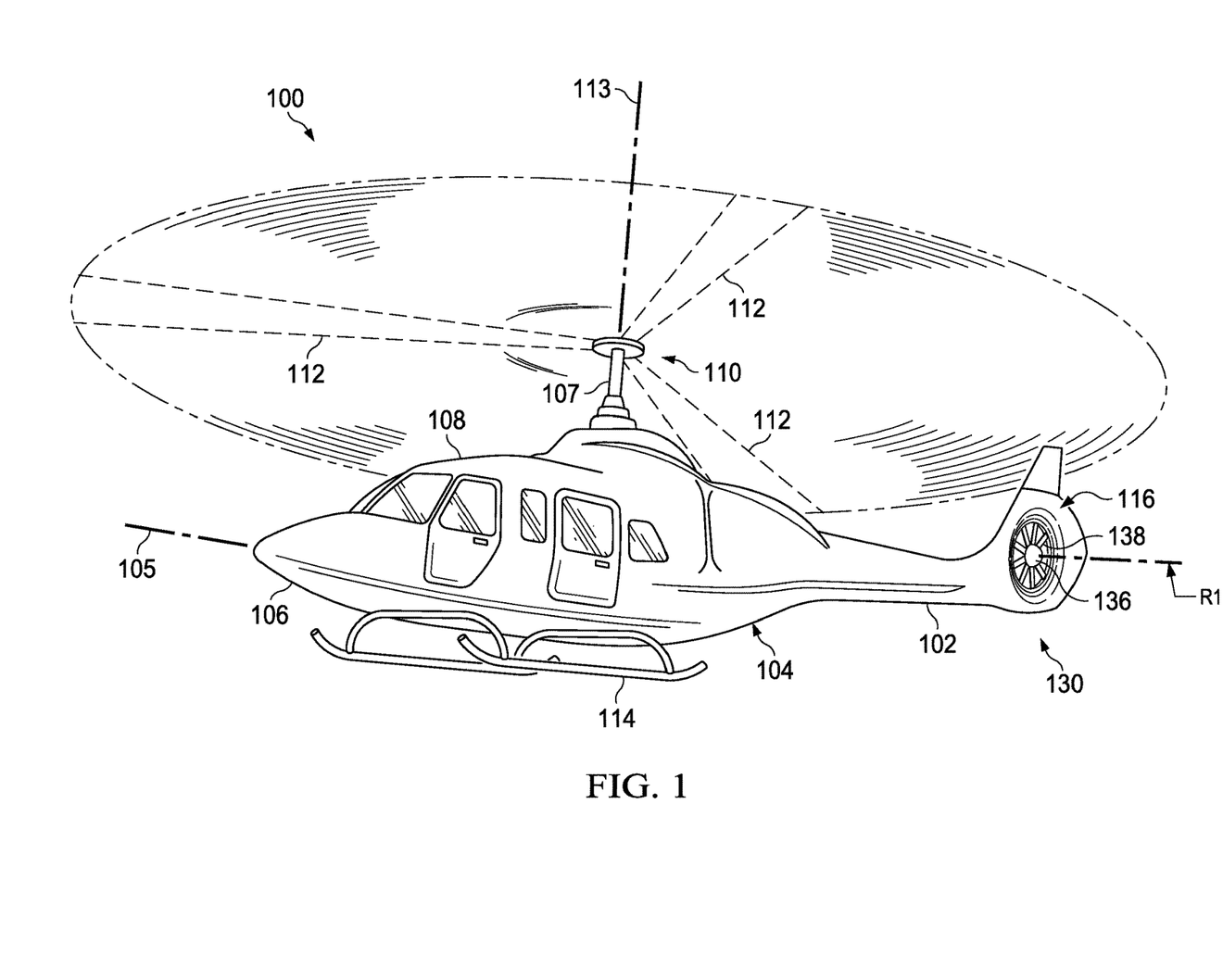
FIG. 1 is an oblique view of a rotorcraft with a ducted rotor assembly with a noise control system, according to an exemplary embodiment.
Figure 2:
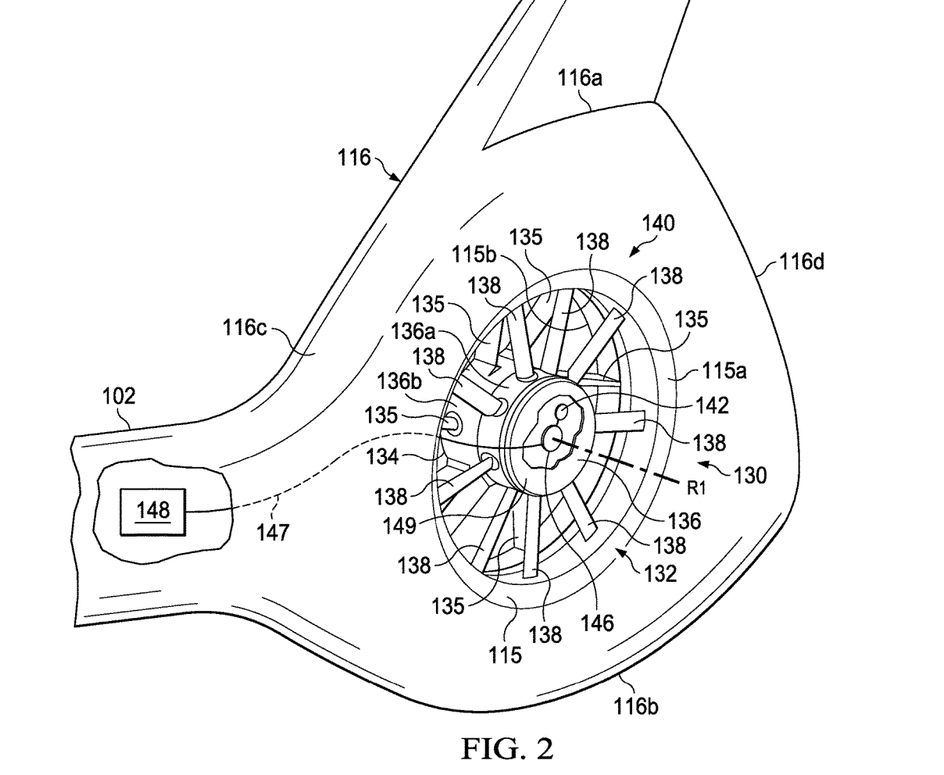
FIG. 2 is an oblique, partially broken away view of the ducted rotor assembly of FIG. 1 with a noise control system.

Referring to FIGS. 1-2 in the drawings, a rotorcraft, such as a helicopter 100, having a noise control system 140 is illustrated. Helicopter 100 includes a body 104 with a front portion 106 and a tail portion 102 having a longitudinal axis 105. The body 104 can include a fuselage 108 in the front portion 106. Helicopter 100 includes a main rotor assembly 110 having a main rotor shaft 107 and rotor blades 112. Blades rotate about a longitudinal axis 113 of the main rotor shaft 107. Main rotor assembly 110 generates a lift force that supports the weight of the helicopter 100 and a thrust force that counteracts aerodynamic drag. The main rotor assembly 110 can also be used to induce pitch and roll of helicopter 100. Landing gear 114 supports helicopter 100 when helicopter 100 is landing and/or when helicopter 100 is on the ground.

The tail portion 102 includes a ducted rotor assembly 130. The ducted rotor assembly 130 includes a rotor 132 and a stator 134 downstream of the rotor 132 disposed in a duct 115. The duct 115 is generally annular in shape and extends transversely through a shroud 116. The duct 115 includes an inlet 115a at a leading edge and an outlet 115b at a trailing edge. The shroud 116 can include a top region 116a, a bottom region 116b, a front region 116c, and a rear region 116d. This type of ducted rotor assembly 130 disposed in tail portion can be referred to as a Fenestron (or fantail).

The rotor 132 is rotatably mounted within the duct 115. The rotor 132 includes a hub 136 and two or more blades 138 supported within the duct 115. The two or more blades 138 rotate about an axis of rotation R1 that is substantially concentric with the axis of the duct 115. The rotor 132 can include any suitable number of blades 138 (e.g., seven blades 138 as illustrated in FIG. 2). The axis of rotation R1 is generally perpendicular to the longitudinal axis 105 of the body 104. The axis of rotation R1 can also be generally perpendicular to the longitudinal axis 113 of the main rotor shaft 107.

The hub 136 includes a rotating hub portion 136a and a stationary hub portion 136b. The rotating hub portion 136a can be adjacent to the leading edge 115a of the duct 115 and the stationary hub portion 136b can be adjacent to the trailing edge 115b of the duct 115. The rotating and stationary hub portions 136a, 136b are generally hollow. In some embodiments, there are various mechanical systems and components disposed in the rotating and stationary hub portions 136a, 136b (e.g., tuning weights to reduce power requirements and pitch control loads).

Stator 134 is fixedly mounted within duct 115 and includes stationary hub 136b (e.g., a non-rotating hub) and a plurality of fixed vanes 135 that extend from the stationary hub 136b to the duct 115. Stator 134 can include any suitable number of fixed vanes 135, e.g., equal to or unequal to the number of rotor blades 138.

The ducted rotor assembly 130 counters the torque effect created by the main rotor assembly 110 and allows a pilot to control the yaw of the helicopter 100. During operation of the ducted rotor assembly 130, air is drawn from the inlet 115a by the ducted rotor assembly 130 and exits at the outlet 115b.

Figure 3:
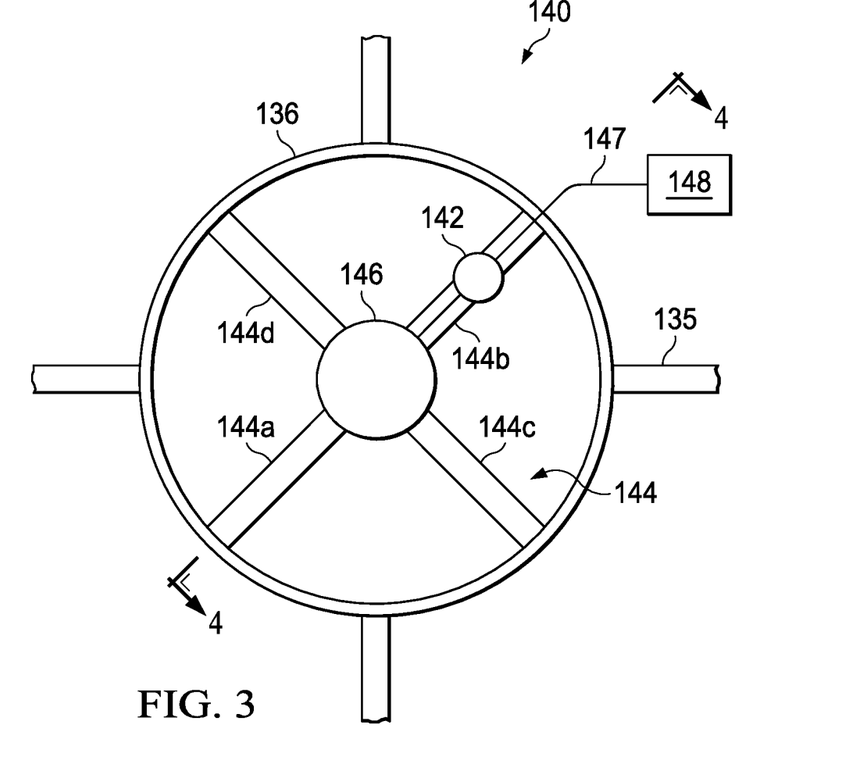
FIG. 3 is a front view of the noise control system of FIG. 1 with the cover removed.
Figure 4:
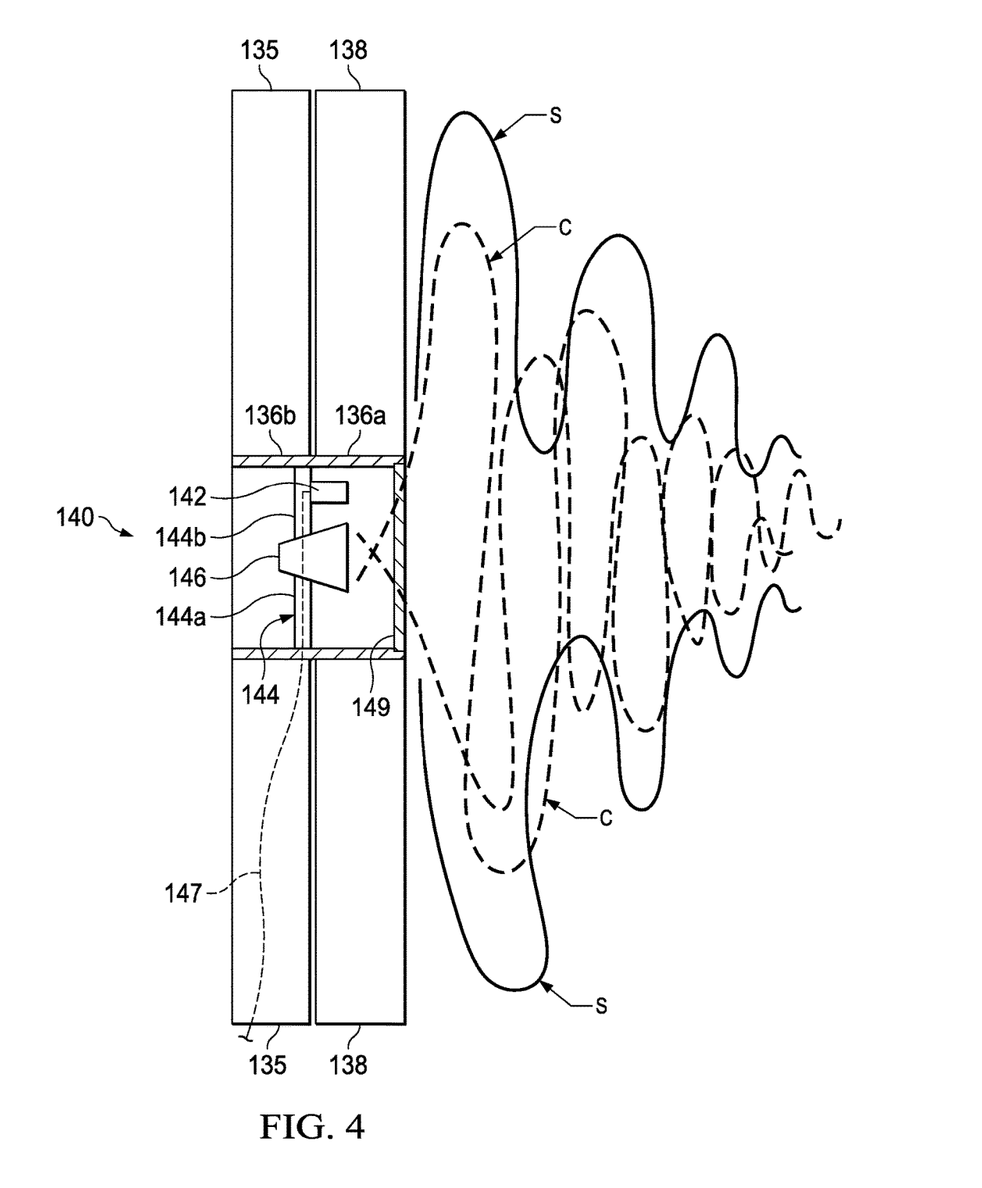
FIG. 4 is a schematic cross-sectional view taken along the line 4-4 of FIG. 3 with a simplified illustration of the cancellation noise and sound input waveforms.

As shown in FIGS. 2-4, the noise control system 140 is associated with the ducted rotor assembly 130 and can reduce the acoustic signature thereof. The noise control system 140 can include a microphone 142, a speaker unit 146, and a controller 148. Wires 147 are coupled to the microphone 142, the speaker unit 146, and the controller 148 and serve to provide electrical power from a power source and provide operational control throughout the noise control system 140. In an embodiment, the microphone 142 is configured to receive a sound input S (e.g., noise from the ducted rotor assembly 130) and the speaker unit 146 is configured to generate a cancellation noise C during operation of the ducted rotor assembly 130. The controller 148 is operably connected to the microphone 142 and the speaker unit 146.

In an embodiment, at least one of the microphone 142 and speaker unit 146 are associated with the hub 136. A cover 149 is provided as a cap on hub 136 and allows sound waves to pass therethrough and prevents dirt, debris and foreign objects from entering the hub 136. In an exemplary embodiment, cover 149 is a metallic mesh. However, is should be appreciated that cover 149 may be any material that permits sound wave transmission therethrough.

In an illustrative embodiment shown in FIGS. 3-4, the microphone and speaker 142, 146 are disposed in the rotating hub portion 136a and supported therein by a support member 144 coupled to the stationary portion 136a of the hub 136. The microphone and speaker 142, 146 are supported in the hub 135 by a support member 144. The support member can include a first arm 144a, a second arm 144b, a third arm 144c, and a fourth arm 144d. The base end of each of the arms 144a-d is bolted to the inner surface of the stationary portion 136b of the hub 136 and the opposite end is connected to the speaker unit 146 using conventional fasteners such that the speaker unit 146 is located substantially in the central area of the hub 136 and substantially aligned with the axis of rotation R1 of the blades 138. Although the support member 144 has been described as having four arms, it should be understood that fewer or more arms or other components could be used to provide structural support for the microphone and speaker 142, 146 within the hub 136.

In an embodiment, the controller 148 can be disposed adjacent to the ducted rotor assembly 130 (e.g., in the tail portion 102) as shown in FIG. 2. In some embodiments, the controller 148 is disposed in the front portion 106 of the body 104. The controller 148 is configured to selectively adjust harmonics of the cancellation noise to reduce the acoustic signature of the ducted rotor assembly 130. Harmonics of the cancellation noise can include at least one of a frequency, an amplitude, and a phase; however, it should be appreciated that harmonics can include other sound wave features.

Figure 5:
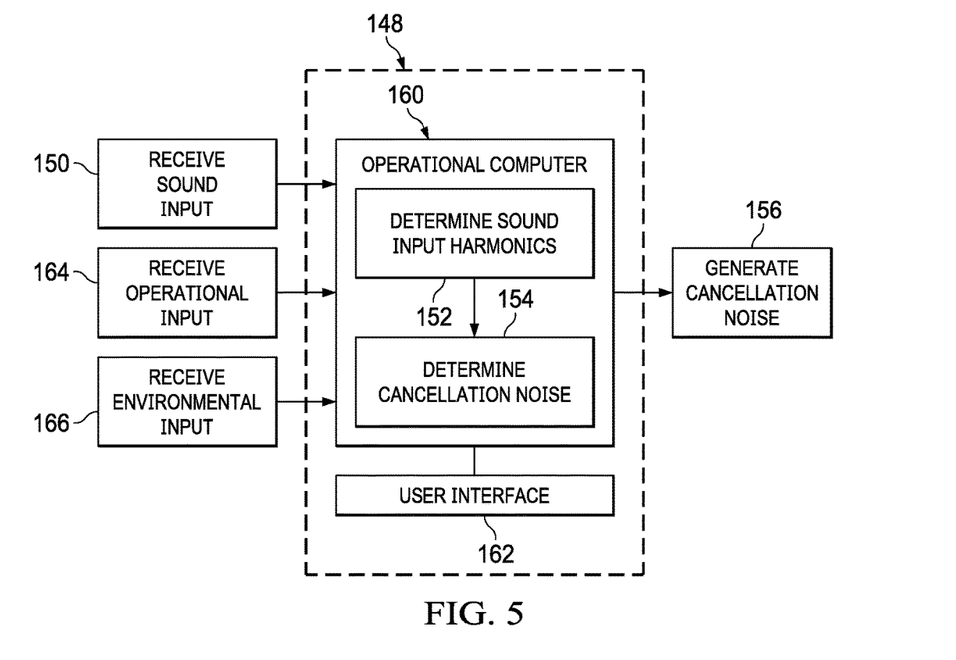
FIG. 5 is a diagram of a method for reducing an acoustic signature of a ducted rotor assembly.

The controller 148, schematically shown in FIG. 5, receives sound inputs 150 (e.g., noise from operation of the ducted rotor assembly) from microphone 142 and determines the sound input harmonics 152. After the sound input harmonics are determined in step 152, the controller then determines a cancellation noise in step 154. The cancellation noise is determined based upon the sound input harmonics. The cancellation noise is used to cancel out or significantly reduce the amplitude of primary frequencies of the sound input. In an embodiment of determining a cancellation noise 154, harmonics of the cancellation noise are selectively adjusted such that at least one of a frequency, an amplitude, and a phase is modified as compared to the sound input harmonics, thereby creating a cancellation effect. In an illustrative embodiment of determining a cancellation noise 154, the frequency of the cancellation noise is selectively adjusted to have the same amplitude but with an inverted phase of the sound input harmonics, thereby creating a phase cancellation effect. Where the phase is inverted but the amplitude is not equal, a reduced cancellation effect occurs. Although described as a cancellation noise C, it is should be appreciated that the cancellation noise generated by the noise control system 140 is generally sufficient to reduce the sound input S to a sound level about equal to that of the engine and transmission of the helicopter 100 as opposed to completely cancelling out the sound input S.

The speaker unit 146 receives a signal from the controller 148 and generates the cancellation noise in step 156. As shown schematically in FIG. 4, the cancellation noise C generated from the speaker unit 146 interferes with the sound input S from the ducted rotor assembly 130 to reduce the acoustic signature thereof. The cancellation noise C can be comprised of constructive and/or destructive sound waves. In an embodiment, the speaker unit 146 disposed in a central location (e.g., hub 136) of the ducted rotor assembly 130 allows the cancellation noise C to be broadcast adjacent to and/or in the center of the sound input S (e.g., noise from the ducted rotor assembly 130), which improves the effectiveness of the cancellation noise C to interfere with the sound input S. The speaker unit 146 disposed in the hub 136 of the ducted rotor assembly 130 advantageously provides a contiguous cancellation effect and reduces the acoustic signature thereof.

Referring to FIG. 5, controller 148 is illustrated. Controller 148 can include an automatic mode and/or a manual mode. In some embodiments, the controller can respond to sensor input from sensors within the helicopter 100 to automatically reduce the acoustic signature of the ducted rotor assembly 130. Sensors can provide information comprising engine revolutions per minute (rpm), rotor blade 112 rpm, blades 138 rpm, thrust, descent rate, and/or altitude among others to controller 148. For example, the noise control system 140 can be triggered to reduce the acoustic signature of the ducted rotor assembly 130 when the blades 138 rpm is above a predetermined rpm. In another illustrative embodiment, the noise control system 140 can be triggered at certain altitudes.

Controller 148 can include an operational computer 160 and a user interface 162. Operational computer 160 receives multiple inputs. Operational computer 160 receives operational and environmental inputs 164, 166 typically via existing systems within helicopter 100. Operational inputs 164 can refer to helicopter 100 in particular, such as main rotor blade 112 rpm, blade 138 rpm, helicopter speed, torque, thrust, and so forth. Environmental inputs 166 can refer to general environmental conditions such as air temperature, air density, altitude, and so forth. Operational and environmental inputs 164, 166 are continuously transmitted to operational computer 160. Operational computer 160 uses inputs to aid in operating noise control system 140.

Operational computer 160 also receives user inputs typically from a pilot (not shown) via a user interface 162. User interface 162 permits a user, such as a pilot to operate and adjust noise control system 140. User interface 162 is typically an interactive digital device, such as a touch screen, for example, that provides a graphical view concerning the location of the aircraft in relation to other objects such as terrain, aircraft, structures, vehicles, and so forth. Typically, some of the features of user interface 162 may include a mapping function to illustrate these objects in relation to helicopter 100, the ability to zoom in and out on the screen, and the ability to select a "quiet zone" or a cancellation area relative to location of the helicopter 100. The controller 148 can automatically adjust harmonics of the cancellation noise to compensate for relative motion between the aircraft and the cancellation area.

It is understood that user interface 162 is not limited to those features described above. User interface 162 also communicates to the pilot performance data of the noise control system 140, such as cancellation effects, frequency, amplitude, and so forth. Cancellation effects refer to the resulting sound level generated during operation of the ducted rotor assembly 130. Though typically a touch screen device would be used, other methods of permitting pilot control are possible such as mechanical dials, for example. Likewise, though a pilot has been described as operating user interface 162, any member of a crew in helicopter 100 may use user interface 162. Any person interacting with user interface 162 may be termed a user of user interface 162 whether the person is the pilot, a crew member, or a remote person not on helicopter 100.

In manual mode, user interface 162 transmits a set of user commands from the pilot, typically via wires 147, to operational computer 160. Operational computer 160 simultaneously analyzes inputs (e.g., sound input 150, operational input 164, and environmental input 166) and the user commands from user interface 162. Operational computer 160 then transmits system commands to the various devices in the noise control system 140 to generate a cancellation noise of selected amplitude, frequency, and phase needed to cancel out the sound inputs S from the ducted rotor assembly 130. Although wires 147 are described and the method of transmitting and communicating between devices within the noise control system 140, other methods of transmitting signals such as wireless communications are possible.

In the preferred embodiment, operational computer 160 and/or user interface 162 is integrated within existing computers on helicopter 100 thereby reducing the weight required to install the noise control system 140 on helicopter 100. Likewise, operational and environmental inputs 164, 166 are typically generated by existing sensors and software on helicopter 100 so as to decrease the weight and space required to implement the noise control system 140. Although described as being integrated within existing systems on helicopter 100, it is understood that other embodiments permit operational computer 160 and/or user interface 162 to be a separate unit located on or off helicopter 100. For example, operational computer 160 and/or user interface 162 may be located remote to helicopter 100, such as on another aircraft, ground vehicle, structure, or ship. In addition, noise control system 140 may also use additional sensors to gather inputs 164, 166. By being independent and separate from existing systems on helicopter 100, noise control system 140 is adapted to be retrofitted to existing aircraft.

In embodiments where wireless connections are used, a user can be located remote to helicopter 100 may access and control any portion of noise control system 140. Typically, control from a remote location would occur in the use of remote flying aircraft, such as unmanned aerial vehicles, for example, but are not so limited. Wireless connections wherein controller 148 is remote to helicopter 100 would further help facilitate retrofitting aircraft with noise control system 140, generally needing only to update software on the existing aircraft.

Although controller 148 is described as including operational computer 160 and user interface 162, it should be appreciated that either one may be removed. For example, where the sound input to be cancelled consists of a constant phase, frequency, amplitude and timing; controller 148 can consist of only user interface 162 to turn the noise control system 140 on and off and select cancellation areas.

Figure 6:
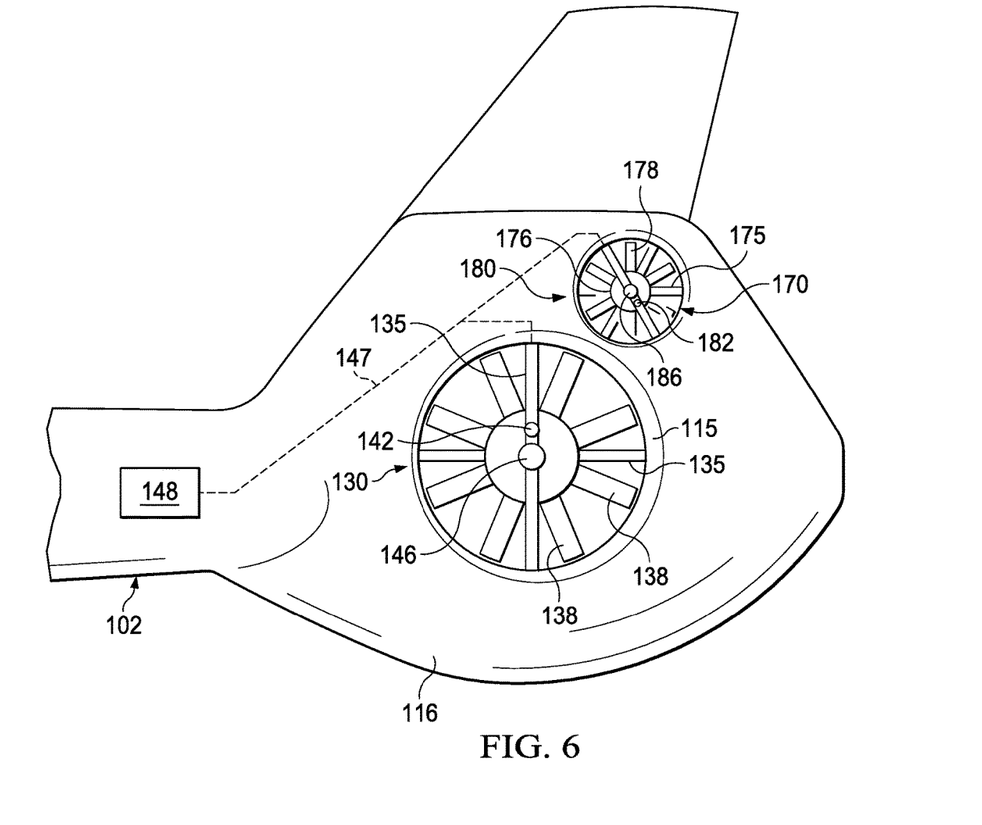
FIG. 6 is a front view of a tail portion of a rotorcraft with a first ducted tail rotor, a second ducted tail rotor, and a noise control system (with the cover removed)

FIG. 6 is another example embodiment of the noise control system 140. A second ducted rotor assembly 170 is included in shroud 116. Second ducted rotor assembly 170 is substantially similar to the ducted rotor assembly 130 and bears similar reference characters to the components of the ducted rotor assembly 130, but with a leading "17" rather than a leading "13", except as noted herein. The noise control system 140 can include a second microphone 182 and a second speaker unit 186 disposed in the second hub 176. The second microphone and second speaker unit 182, 186 are connected to the controller 148 and a power source via wires 147. The second microphone 182 is configured to receive a sound input (e.g., noise from the second ducted rotor assembly 170) and the second speaker unit 186 is configured to generate a second cancellation noise during operation of the second ducted rotor assembly 170. The controller 148 is configured to selectively adjust harmonics of the second cancellation noise generated from the second speaker unit 186 to reduce the acoustic signature of the second ducted rotor assembly 170.

Figure 7:
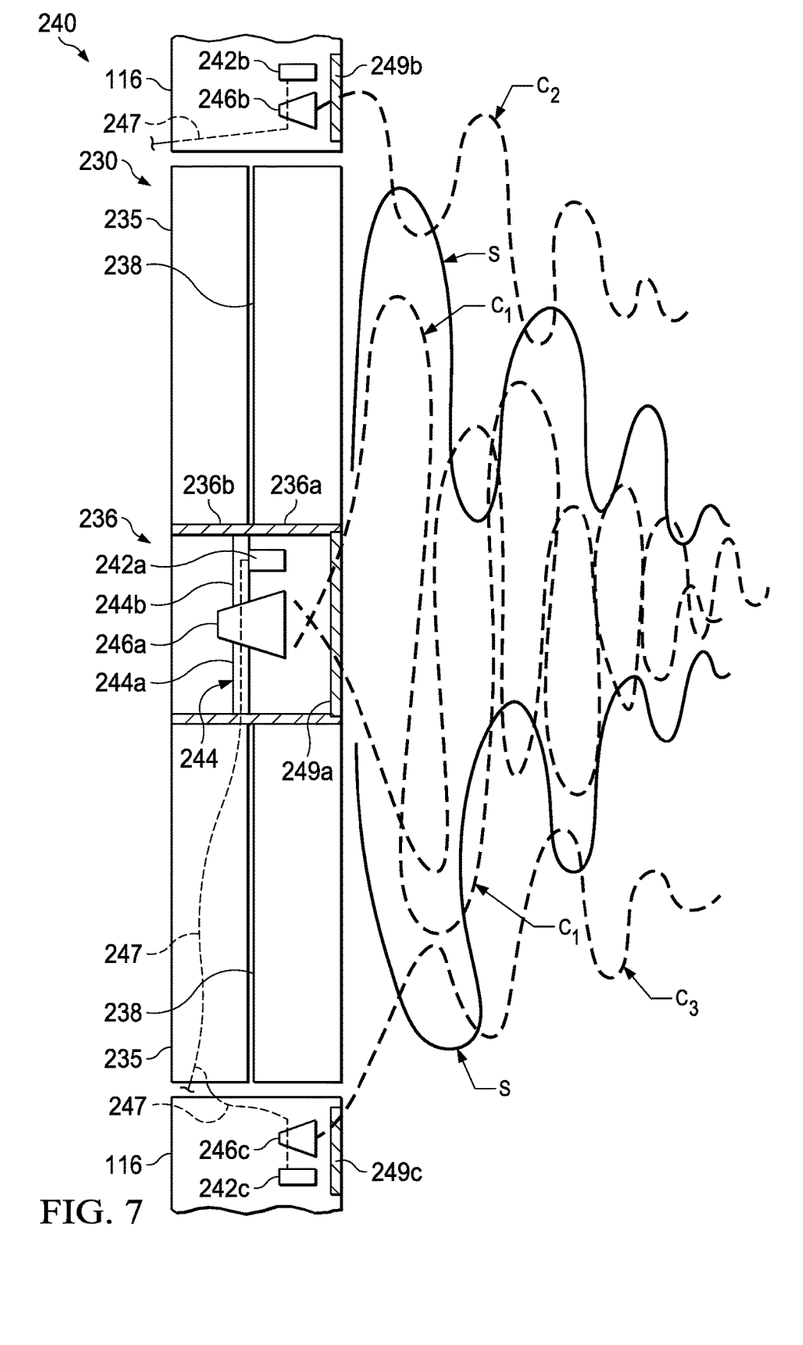
FIG. 7 is a schematic cross-sectional view of an embodiment of a noise control system with a simplified illustration of the cancellation noise and sound input waveforms.

FIG. 7 is another example of embodiment of a noise control system 240. The ducted rotor assembly 230 and the noise control system 240 are substantially similar to the ducted rotor assembly 130 and the noise control system 140 but with a leading "2" rather than a leading "1", except as noted herein. The noise control system 240 includes a first microphone 242a and a first speaker unit 246a disposed in the hub 236 as described herein. The noise control system 240 further includes at least one of a second microphone 242b, a second speaker unit 246b, a third microphone 242c, and a third speaker unit 246c. In an illustrative embodiment, at least one of the first and second microphones 242b, 242c and first and second speaker units 246b, 246c are disposed adjacent to the ducted rotor assembly 230. In an embodiment, at least one of the first and second microphones 242b, 242c and first and second speaker units 246b, 246c are disposed in and/or underneath the shroud 116. A first cover 249a is provided on the hub 236 to permit sound waves to pass therethrough to/from the first microphone 242a and first speaker unit 246a. In an exemplary embodiment, a second cover 249b and a third cover 249c are disposed in the shroud 116 to permit sound waves to pass therethrough to/from the second and third microphones 242b, 242c and the second and third speaker units 246b, 246c, respectively. The first speaker unit 246a is configured to generate a first cancellation noise $C_1$ that emits from the hub 236 disposed generally in the center of the sound input S. At least one of the second speaker unit and third speaker unit 246b, 246c generates a second cancellation noise and/or a third cancellation noise $C_2$ and C3, respectively, that interferes with the sound input S (e.g., noise from the ducted rotor assembly 230). The second and third cancellation noises can each be comprised of constructive and/or destructive sound waves). Advantageously, at least one of the second and third speaker units 246b, 246c disposed adjacent to the ducted rotor assembly 230 generates a second and/or third cancellation noise $C_2$, $C_3$ adjacent to the sound input S (e.g., noise from the ducted rotor assembly 130), which can provide an instant cancellation effect and reduces the acoustic signature thereof. In some embodiments, at least one of the second and third microphones 242b, 242c and/or the second and third speaker units 246b, 246c serves as a redundant system in event that the first microphone and/or speaker unit 242a, 246a are damaged, destroyed, or fails to operate as designed.

Figure 8:
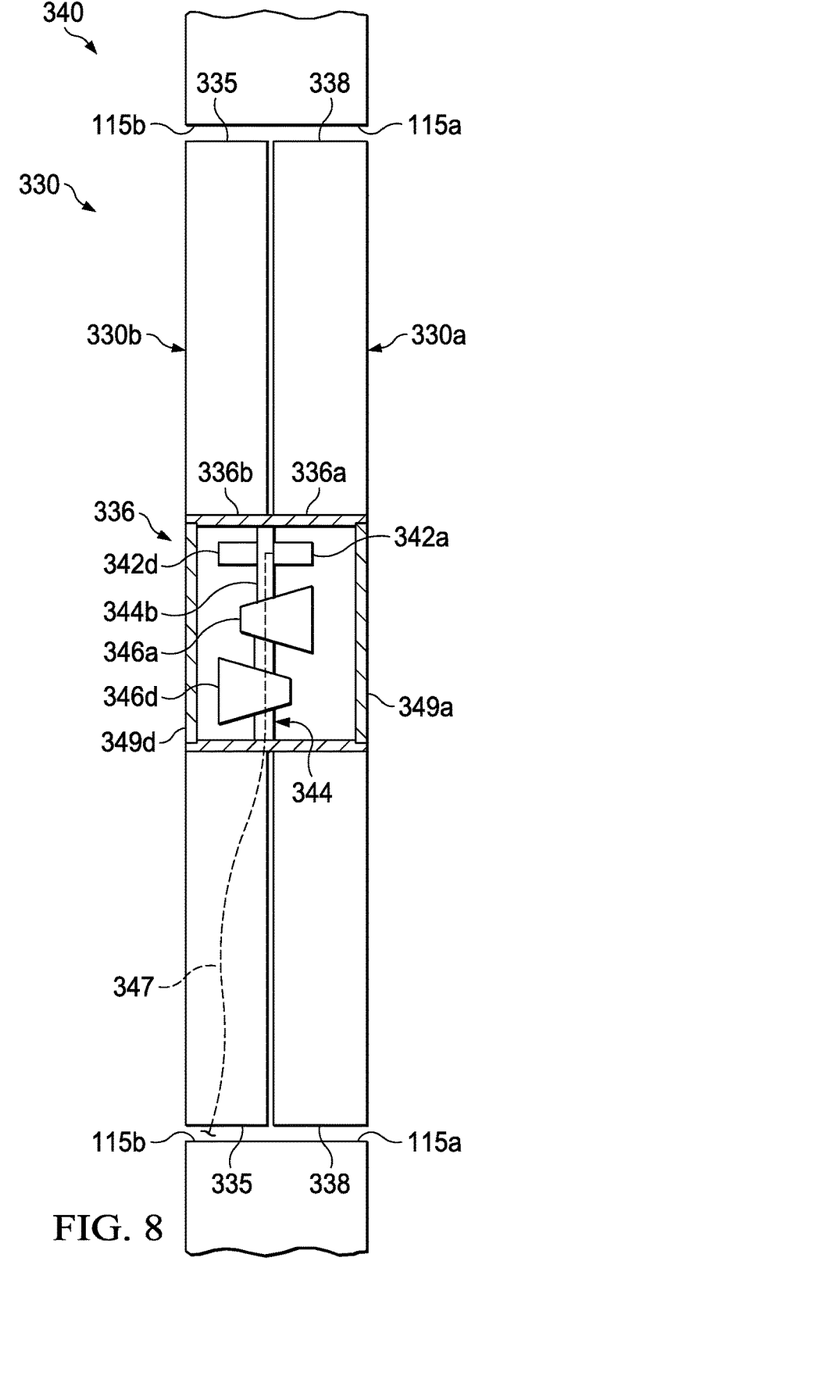
FIG. 8 is a schematic cross-sectional view of an embodiment of a noise control system with a simplified illustration of the cancellation noise and sound input waveforms.

FIG. 8 is another example of embodiment of a noise control system 340. The ducted rotor assembly 330 and the noise control system 340 are substantially similar to the ducted rotor assembly 130 and the noise control system 140 and but with a leading "3" rather than a leading "1", except as noted herein. The noise control system 340 includes at least one of an inlet microphone 342a and an inlet speaker unit 346a disposed in the hub 336 adjacent to the inlet side 330a of the ducted rotor assembly 330. The noise control system 340 further includes at least one of an outlet microphone 342d and an outlet speaker unit 346d. In an illustrative embodiment, at least one of the outlet microphone and speaker unit 342d, 346d is disposed in the hub 336 adjacent to the outlet side 330b of the ducted rotor assembly 330. In some embodiments, at least one of the inlet microphone 342a and the inlet speaker unit 346a are disposed in the rotating hub portion 336a. In an embodiment, at least one of the outlet microphone 342d and the outlet speaker 346d are disposed in the stationary hub portion 336b. Advantageously, the noise control system 340 can determine sound harmonics by a controller as described herein and generate a cancellation noise by the inlet and outlet speaker units 346a, 346d on both the inlet and outlet sides 330a, 330b of the ducted rotor assembly. An inlet cover 349a and an outlet cover 349d permit sound waves to pass therethrough and prevent dirt, debris and foreign objects from entering hub 336.

The noise control system and methods described herein can advantageously provide at least one of the following: (1) the ability to emit a cancellation noise from the center of the source of the noise (e.g., the ducted rotor assembly), which can improve the cancellation effect of the cancellation noise; (2) the system can be integrated into existing aircraft components and flight systems; (3) the ability to reduce the acoustic signature of a ducted tail rotor assembly; and (4) the system can be disposed within the rotorcraft structures, which provides protection for the noise control system and does not contribute to any drag forces for the rotorcraft.

It may be advantageous to set forth definitions of certain words and phrases used in this patent document. The terms "a" and "an" are defined as one or more unless this disclosure explicitly requires otherwise. Terms such as "first" and "second" are used only to differentiate features and not to limit the different features to a particular order or to a particular quantity. The term "substantially" is defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Use of broader terms such as comprises, includes, and has (and any derivatives of such terms, such as comprising, including, and having) should be understood to provide support for narrower terms, such as consisting of, consisting essentially of, and comprised substantially of. Thus, in any of the claims, the term "consisting of," "consisting essentially of," or "comprised substantially of" can be substituted for any of the open-ended linking verbs recited above in order to change the scope of a given claim from what it would otherwise be using the open-ended linking verb.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. The feature or features of one embodiment may be applied to other embodiments to achieve still other embodiments, even though not described, unless expressly prohibited by this disclosure or the nature of the embodiments. The scope of protection is not limited by the description set out above but is defined by the claims that follow, the scope including all equivalents of the subject matter of the claims. Each and every claim is incorporated as further disclosure into the specification and the claims are embodiment(s) of the present invention.

What is claimed is:

1. A noise control system for a ducted rotor assembly, the ducted rotor assembly including a hub, a duct, and two or more blades coupled to the hub and supported by the duct, comprising: a first microphone configured to receive a sound input generated by the ducted rotor assembly, the first microphone configured for association with the hub; a first speaker unit configured to generate a first cancellation noise, the first speaker unit disposed in the hub; a second microphone configured to receive a sound input generated by the ducted rotor assembly, the second microphone disposed in and/or underneath a shroud adjacent to the ducted rotor assembly; a second speaker unit configured to generate a second cancellation noise, the second speaker unit disposed in and/or underneath the shroud adjacent to the ducted rotor assembly; and a controller operably connected to the first microphone, the first speaker unit, the second microphone, and the second speaker unit; the controller configured to selectively adjust harmonics of the first cancellation noise and the second cancellation noise to reduce an acoustic signature of the ducted rotor assembly.

2. The noise control system according to claim 1, wherein the first microphone is disposed in the hub.

3. The noise control system according to claim 1, wherein the first speaker unit is disposed substantially in the center of the hub.

4. The noise control system according to claim 1, wherein the harmonics comprise at least one of a frequency, an amplitude, and a phase.

5. The noise control system according to claim 1, further comprising a second ducted rotor assembly including a second hub, a second duct, and two or more blades coupled to the second hub and supported by the second duct, comprising: a third microphone configured to receive a sound input generated by the second ducted rotor assembly, the third microphone configured for association with the second hub and operably connected to the controller; and a third speaker unit configured to generate a third cancellation noise, the third speaker unit configured for association with the second hub and operably connected to the controller.

6. The noise control system according to claim 1, wherein the first microphone disposed adjacent to an inlet side of the ducted rotor assembly, the second microphone disposed adjacent to an outlet side of the ducted rotor assembly and, the second speaker unit disposed adjacent to the outlet side of the ducted rotor assembly.

7. A rotorcraft, comprising: a body, including a front portion and a tail portion; a main rotor system coupled to the front portion of the body; and a ducted rotor assembly coupled to the tail portion of the body, the ducted rotor assembly comprises a hub, a duct, two or more blades coupled to the hub, and supported by the duct; and a noise control system comprising: a first microphone configured to receive a sound input generated by the ducted rotor assembly, the first microphone configured for association with the hub; a first speaker unit configured to generate a first cancellation noise, the first speaker unit disposed in the hub; a second microphone configured to receive a sound input generated by the ducted rotor assembly, the second microphone disposed in and/or underneath a shroud adjacent to the ducted rotor assembly; a second speaker unit configured to generate a second cancellation noise, the second speaker unit disposed in and/or underneath the shroud adjacent to the ducted rotor assembly; and a controller operably connected to the first microphone, the first speaker unit, the second microphone, and the second speaker unit; the controller configured to selectively adjust harmonics of the first cancellation noise and the second cancellation noise to reduce an acoustic signature of the ducted rotor assembly.

8. The rotorcraft according to claim 7, wherein the first microphone is disposed in the hub.

9. The rotorcraft according to claim 7, wherein the first speaker unit is disposed substantially in the center of the hub.

10. The rotorcraft according to claim 7, wherein the harmonics comprise at least one of a frequency, an amplitude, and a phase.

11. The rotorcraft according to claim 7, wherein the first microphone disposed adjacent to an inlet side of the ducted rotor assembly, the second microphone disposed adjacent to an outlet side of the ducted rotor assembly and the second speaker unit disposed adjacent to the outlet side of the ducted rotor assembly.

12. A method of reducing an acoustic signature of a ducted rotor assembly, the ducted rotor assembly including a hub, a duct, and two or more blades coupled to the hub and supported by the duct, the method comprising: receiving, by a microphone associated with the hub, a sound input generated by the ducted rotor assembly; determining a sound input harmonics by a controller; determining a first cancellation noise and a second cancellation noise by the controller based upon the sound input harmonic; generating the first cancellation noise by a speaker unit disposed in the hub; and generating the second cancellation noise by a speaker unit disposed in and/or underneath a shroud adjacent to the ducted rotor assembly.

13. The method according to claim 12, wherein the microphone is disposed in the hub.

14. The method according to claim 12, wherein the step of determining a first cancellation noise and a second cancellation noise comprises: selectively adjusting harmonics of the first cancellation noise and the second cancellation noise.

15. The method according to claim 14, wherein the harmonics comprise at least one of a frequency, an amplitude, and a phase.

* * * * *